Aug. 28, 1934.　　　H. A. PENROSE　　　1,971,462
INTERNAL COMBUSTION ENGINE
Filed June 16, 1931　　　3 Sheets-Sheet 1
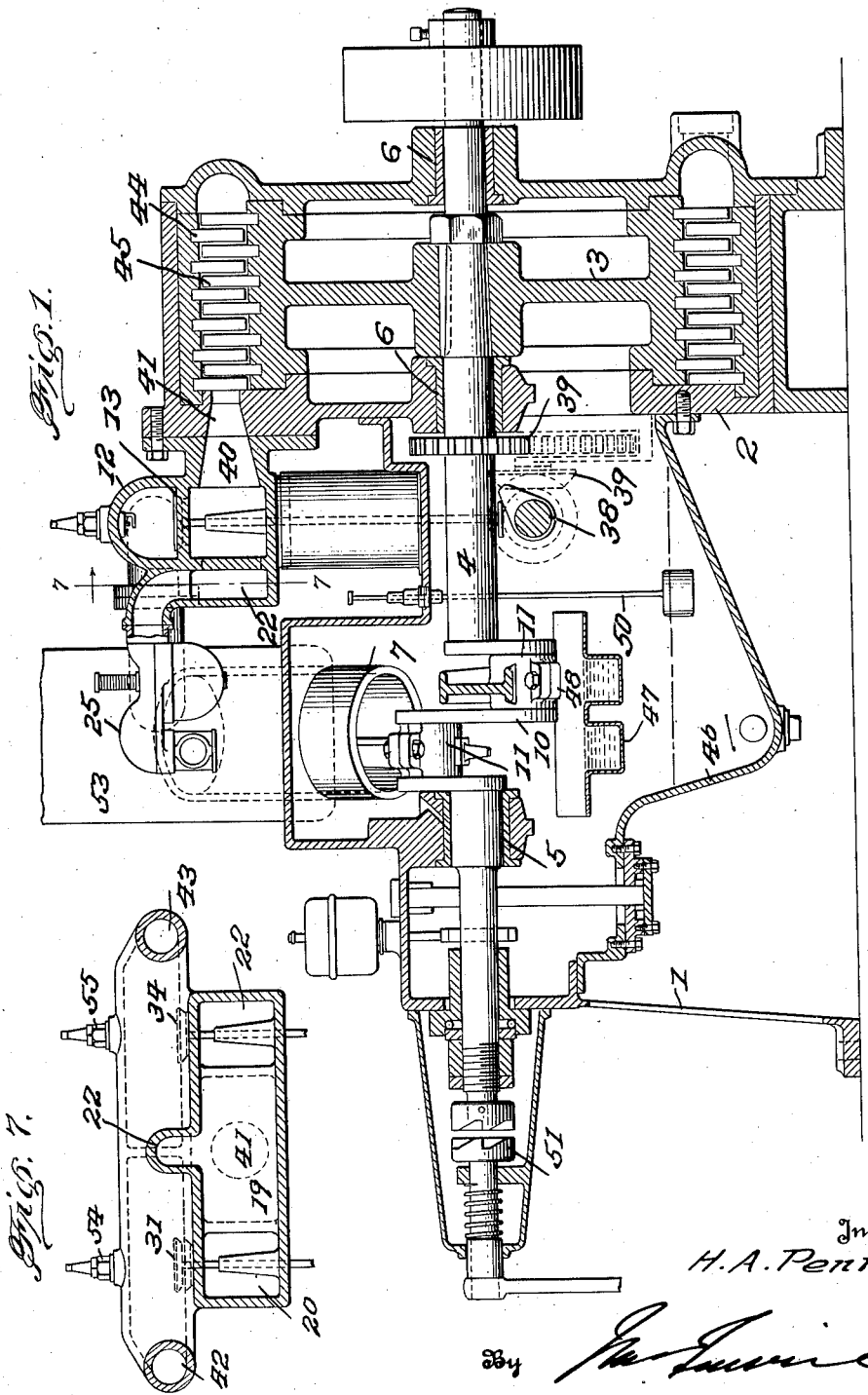
Inventor
H. A. Penrose
By
Attorney

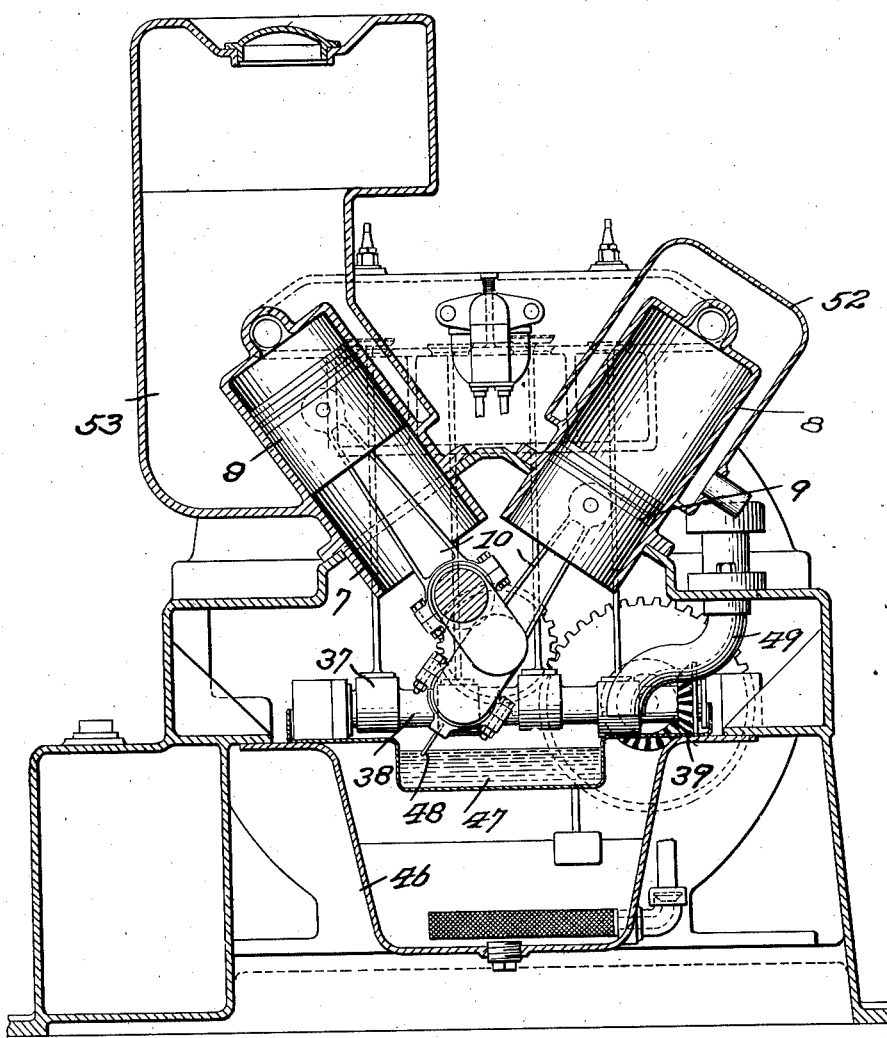

Aug. 28, 1934.     H. A. PENROSE     1,971,462
INTERNAL COMBUSTION ENGINE
Filed June 16, 1931     3 Sheets-Sheet 3
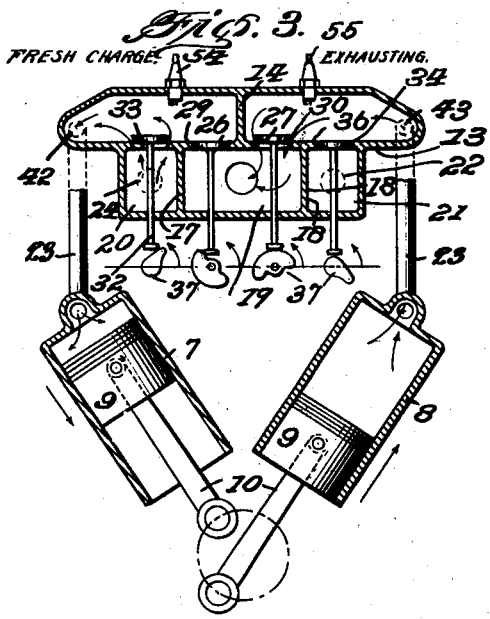
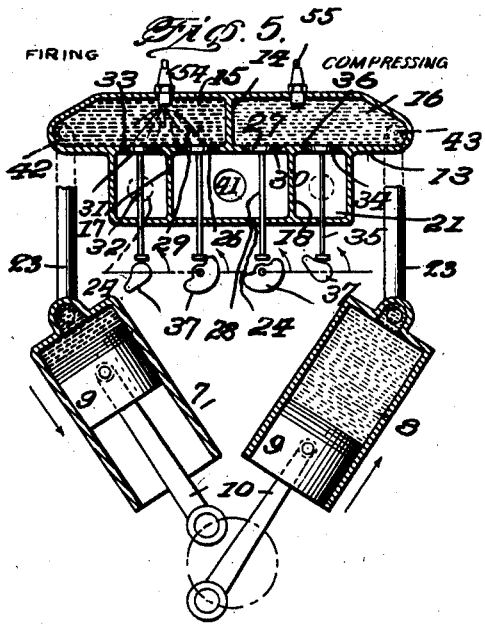
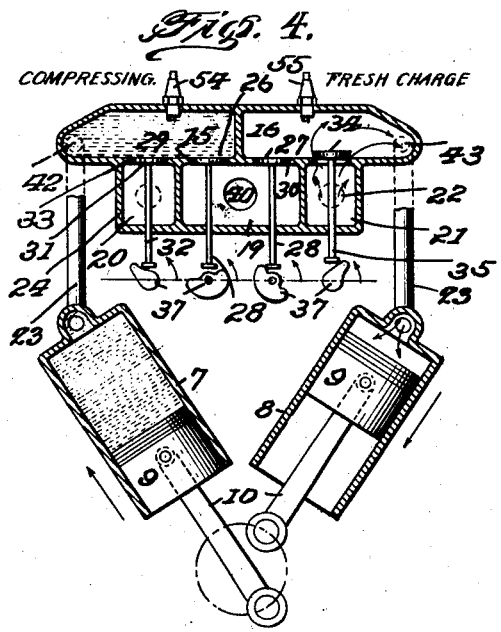
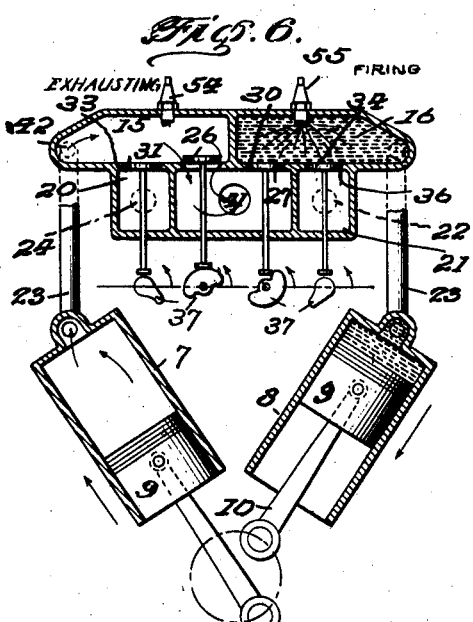
Inventor
H. A. Penrose
By
Attorney Patented Aug. 28, 1934

1,971,462

UNITED STATES PATENT OFFICE 1,971,462

INTERNAL COMBUSTION ENGINE

Hallack A. Penrose, Brooklyn, N. Y.

Application June 16, 1931, Serial No. 544,813

2 Claims. (Cl. 60—41)

This invention is directed to an internal combustion engine involving the provision of more or less conventional cylinders and pistons serving as a means for drawing in and compressing a charge, together with a chamber spaced from and having restricted communication with the cylinder, in which chamber the charge compressed in the cylinder is ignited, and a turbine power element in which the charge under the force generated by the ignition thereof is in relatively large proportion directed to serve as a propelling force for the turbine.

A characteristic feature of the present invention is the provision of a firing chamber in which the charge compressed by the piston in the cylinder is directed and in which such charge is ignited, the chamber being provided with a mechanically controlled and properly timed means for directing the force of the ignited fuel charge into direct contact with the blades of the turbine, the firing chamber having a materially restricted communication with the cylinder to avoid a vacuum formation in the cylinder in that stroke thereof corresponding to the power stroke of the piston, and to further utilize the exhaust stroke of the piston as a means for directing the spent gases in the firing chamber toward and into contact with the blades of the turbine for additional operating force thereon.

An object of the invention is the provision of automatically actuated, properly timed valves, one of which serves as the inlet valve to the cylinder and the other of which serves as the outlet valve from the firing chamber to the turbine, these valves being so timed that the fuel inlet valve permits the suction stroke of the piston to draw a charge into the cylinder, with such inlet valve closing on the compression stroke of the piston to permit the charge drawn into the cylinder to be compressed within the firing chamber; the outlet valve being closed during the suction and compression strokes of the piston and opening simultaneously or immediately succeeding the firing of the charge in the compression chamber to establish communication between the compression chamber and the blades of the turbine, the outlet valve also opening on the exhaust of the piston to direct the pressure of such exhaust gases to be delivered against the blades of the turbine for additional power service.

A further object of the invention is the arrangement of the inlet channel to the turbine for ready communication with a plurality of firing chambers, thus permitting a duplication of cylinders and pistons and permitting the operative cycle of such duplicated pistons or cylinders to be so relatively arranged that a battery of cylinders will constitute substantially a constant power force on the turbine.

A further important object of the invention is the provision of a channel of communication between the firing chamber and the cylinder associated therewith of such sectional area as compared with the outlet from the firing chamber to the turbine as will permit only a small proportion of the ignited charge to move into the cylinder, while permitting a very much larger proportion to move into cooperation with the blades of the turbine.

The relative relations of the outlets from the firing chamber to the particular cylinder and to the turbine thus insure that sufficient gas under the pressure generated by the ignition of the fuel will flow to the cylinder to avoid a possible vacuum therein on what corresponds with the power stroke of the piston of that cylinder under ordinary conditions. As the comparatively small volume of gas under pressure is thus freely admitted to the cylinder, the possibility of vacuum formation is precluded and the piston is subjected to a certain pressure which will assist its movement longitudinally of the cylinder and thus overcome any mechanical load on the crank shaft which might otherwise occur. The principal and larger volume of the ignited gas, however, is directed to the turbine, as such turbine constitutes the motor element from which the power of the engine is directly or indirectly derived.

The invention is illustrated in the accompanying drawings, wherein:—

Figure 1 is a vertical section of the improved engine, the parts being shown in elevation.

Figure 2 is a transverse section of the same, parts being in elevation.

Figures 3, 4, 5 and 6 are more or less diagrammatic views illustrating the successive steps of operation of a pair of cylinders illustrating a four-cycle type of operation.

Figure 7 is a section on the line 7—7 of Figure 1.

The improved engine includes an appropriate base or block 1, one end of which is formed with or has secured thereto the turbine casing 2 in which operates a turbine rotor 3, which will be more specifically referred to hereinafter. A crank shaft 4 is mounted in appropriate bearings 5 in the block and 6 in the turbine casing, the turbine rotor being keyed upon the crank shaft within the casing.

In the present instance, the block is formed to provide two cylinders 7 and 8 arranged at an angle to each other, in which operate conventional pistons 9 connected by connecting rods 10 to cranks 11 on the crank shaft. On the upper end of the block is secured a firing head 12 having its major dimension parallel but offset with respect to the plane including both cylinders 7 and 8. The firing head is divided by a longitudinal partition 13, the space above the partition being further divided by a vertical wall 14 into two distinct firing chambers 15 and 16 designed for cooperation with the respective cylinders 7 and 8. The space below the partition 13, which is of somewhat less length than the space above the partition, is divided by vertical walls 17 and 18 into a central outlet chamber 19, and end inlet chambers 20 and 21 each arranged substantially centrally beneath one of the firing chambers, that is, inlet chamber 20 is approximately centrally beneath firing chamber 15, while inlet chamber 21 is approximately centrally beneath the firing chamber 16.

The firing head includes an extension 22 formed with a cored passage 23, the lower end of which is in communication through openings 24 with the inlet chambers 20 and 21, the upper end of the passage 23 being formed for connection with a conventional carbureter 25. Duplicate outlet valves 26 and 27 have their stems 28 extended through the outlet chamber 19, with such valves controlling openings 29 and 30 respectively formed in the partition 13 on the respective sides of the wall 14, the valves opening upwardly and providing for control of communication between the outlet chamber 19 and the respective firing chambers 15 and 16.

A corresponding control valve is provided for each inlet chamber, that is, inlet chamber 20 is provided with a valve 31, the stem 32 of which extends through and below the chamber, with said valve controlling an opening 33 formed in the partition 13 and establishing communication between the firing chamber 15 and the inlet chamber 20. A similar valve 34 having a stem 35 extending through and below inlet chamber 21 controls an opening 36 in the partition 13 to establish communication between inlet chamber 21 and firing chamber 16.

The valves 26, 37, 31 and 34, or more particularly the stems of such valves, are operated for proper sequence and timed operation through the medium of cams 37 arranged on the cam shaft 38 driven through appropriate gearing 39 from the crank shaft, as shown more particularly in Figures 1 and 2. The outlet chamber 19 communicates through a passage 40 in the firing head and a communicating passage 41 in the turbine casing with the interior of the turbine, the passages 40 and 41 being preferably converging toward the turbine to compress the gases passing therethrough and exert a jet-like effect on the turbine blades.

A particularly important feature of the present invention is the communication between each firing chamber and the cooperating cylinder. As illustrated more particularly in Figure 2 and shown diagrammatically in Figures 3, 4, 5 and 6, each firing chamber remote from its outlet end is in open communication with the cylinder cooperating with that chamber through a comparatively small opening, which in any event must be materially less than the outlet opening from said firing chamber. Thus the firing chamber 15 communicates with the cylinder 7 by a comparatively small opening 42, the firing chamber 16 communicating with the cylinder 8 through a correspondingly small opening 43. These openings 42 and 43 are arranged at the ends of the firing chambers remote from the valve controlled outlets from such chambers and beyond the valve controlled inlets to the chambers. That is to say, the distance between the valve controlled inlet openings of each firing chamber and the communication between that chamber and its cooperating cylinder is materially less than the distance between the outlet opening from that chamber and the communication between that chamber and its cooperating chamber. Thus the inlet gases pass over a comparatively short portion or length of the firing chamber and do not pass over the valve controlled outlet from that chamber.

The turbine may be of any desired or conventional type, preferably including fixed blades 44 removably arranged in the interior of the turbine casing 2 and cooperating blades 45 on the turbine rotor 3. The blades 45 alternate with the blades 44 and such blades are conventionally formed to compel a rotary action of the rotor under the influence of a motive fluid delivered under pressure through the channels 40 and 41.

The engine is, of course, designed to be provided with the usual incidental details as, for example, a crank case cover 46, an oil receptacle 47 within the crank case cover from which, through the medium of splasher blades 48, the bearings of the connecting rod of the crank shaft may be lubricated by the usual splash system, the breather tube 49, the oil level indicating means 50, and the usual starting crank connection or clutch 51 for cooperation with the crank shaft in starting the engine. The cylinders 7 and 8 may be jacketed, as at 52, as well as other necessary parts of the engine for cooling purposes, with the cooling fluid supplied from a radiator or tank 53 arranged and connected in any conventional manner.

The operation of the improved engine is illustrated more or less diagrammatically in Figures 3 to 6 inclusive, wherein the respective strokes of the respective pistons and the cooperative control of the valves and firing chambers are clearly indicated. In Figure 3, cylinder 7 is taking in a fresh charge, with the piston approximately at its upper limit of movement, while the piston in cylinder 8 is moving on the exhaust stroke. As the piston in cylinder 7 starts its suction stroke, valve 31 is opened and a fresh charge of fuel is drawn from the carbureter through the opening 24, inlet chamber 20, restricted opening 42 into the cylinder 7. The exhaust gases in the cylinder 8 and firing chamber 16 are forced through the outlet opening 30, past the valve 27 which, as will later appear, has been opened on the firing stroke and held open for the exhaust stroke, into the outlet chamber 19, and from the latter to the turbine through the passages 40 and 41 to utilize the force of this exhaust stroke as a power of the turbine.

In Figure 4, the piston in cylinder 7 has drawn in a charge of fuel and is starting the compression stroke. Under these circumstances, a cylinder 7 and firing chamber 15 will be charged with the indrawn fuel resulting from the preceding suction stroke. The piston in the cylinder 8 is starting a suction stroke and the valve 34 has been opened to permit a charge to be drawn from the carbureter through the inlet chamber 21, opening 22, past the valve 34, through the opening 36, through the firing chamber 15, restricted opening 43, and into the cylinder 8.

In Figure 5, the piston in cylinder 7 has reached a limit of compression stroke, while the piston in cylinder 8 has reached the limit of the suction stroke so that both firing chambers 15 and 16 are charged with fuel but that in chamber 15 is under compression. At this moment ignition takes place as, for example, through a spark plug 54, and simultaneously with the ignition, valve 26 is opened to establish communication between the firing chamber 15 and outlet chamber 19 through the opening 29. Under the expansion of the charge incident to ignition, there is immediate passage of the gases under the pressure of this expansion through the passages 40 and 41 to operate the turbine. At the same time a relatively small proportion of the gases under the pressure of expansion pass through the restricted opening 42 into the cylinder 7 to aid in the return of that cylinder in what would otherwise be the power stroke and to avoid the creation of a vacuum in the cylinder 7 under this piston movement. Naturally, the relation of the opening 42 to the opening 29 is such that a very small proportion of the gases pass into the cylinder, the larger proportion of the gases being directed practically without restriction by the operation of the turbine.

In Figure 6, the completion of the cycle of each piston is presented, the piston in cylinder 7 moving on its exhaust stroke, and as valve 26 is open the exhaust pressure incident to the piston movement is directed into the outlet chamber 19 and through the passages 40 and 41 to aid in turbine movement. The charge in the firing chamber 16 is being ignited through spark plug 55, and simultaneously with or immediately succeeding this ignition, valve 27 is opened to establish communication between the firing chamber 16 and the outlet chamber 19 and through the passages 40 and 41 to the turbine. Of course, the pressure of the ignited charge delivers this charge in very small proportion to the cylinder 8, as previously described in connection with the cylinder 7.

From the above description, it will be apparent that the power of the ignited charge is directed practically in its entirety to operate the turbine and that each exhaust stroke of a piston develops the pressure which is also utilized to assist in turbine operation. Thus the operating pressure on the turbine is substantially constant, though the primary function is to utilize practically all the pressure of the ignited charge for turbine operation.

It will, of course, be understood that while the illustration is directed to a four-cycle engine and but two cylinders are shown, such is not to be understood as a limitation, as any type of engine and any multiple number of cylinders desired may be utilized. It will further be noted that the turbine acts as a muffler, reducing the exhaust force of all gases to a minimum and preventing any noise incident to said exhaust, wherefore the engine is extremely quiet in operation.

I claim:—

1. An engine including a turbine, a plurality of cylinders, a piston operative within each cylinder, a firing head intermediate the cylinders and turbine, said firing head including independent firing chambers, each having communication with one of the cylinders, said head also including a chamber beneath the firing chambers divided to present independent inlet chambers and an intermediate outlet chamber, a source of fuel in open communication with each inlet chamber, a passage leading from the outlet chamber to the turbine, a valve opening toward the firing chamber and establishing communication when open between a particular inlet chamber and the firing chamber, and valves opening toward the firing chambers and each controlling a communication between a particular firing chamber and the common outlet chamber.

2. An engine including a turbine, a plurality of cylinders, a piston in each cylinder and a firing head arranged between the cylinders and turbine, said firing head comprising an upper area divided by a partition to present independent firing chambers, each firing chamber being in relatively restricted communication with a cylinder, the firing head including an area underlying the firing chambers and divided by two partitions to present a central outlet chamber underlying a part of each of the firing chambers and an inlet chamber at each end of the outlet chamber, with each inlet chamber underlying a particular firing chamber, said head including valve controlled communications between each inlet chamber and the immediately overlying firing chamber and between each firing chamber and the common outlet chamber, the restricted communication between each firing chamber and the cylinder connected therewith being of less sectional area than the opening between each firing chamber and the common outlet chamber, whereby on the ignition of a charge in the firing chamber the outlet from such firing chamber to the common outlet chamber presents a greater capacity for the passage of the explosive gases than does the restricted opening between the firing chamber and cylinder.

HALLACK A. PENROSE. [L.S.]